UNITED STATES PATENT OFFICE.

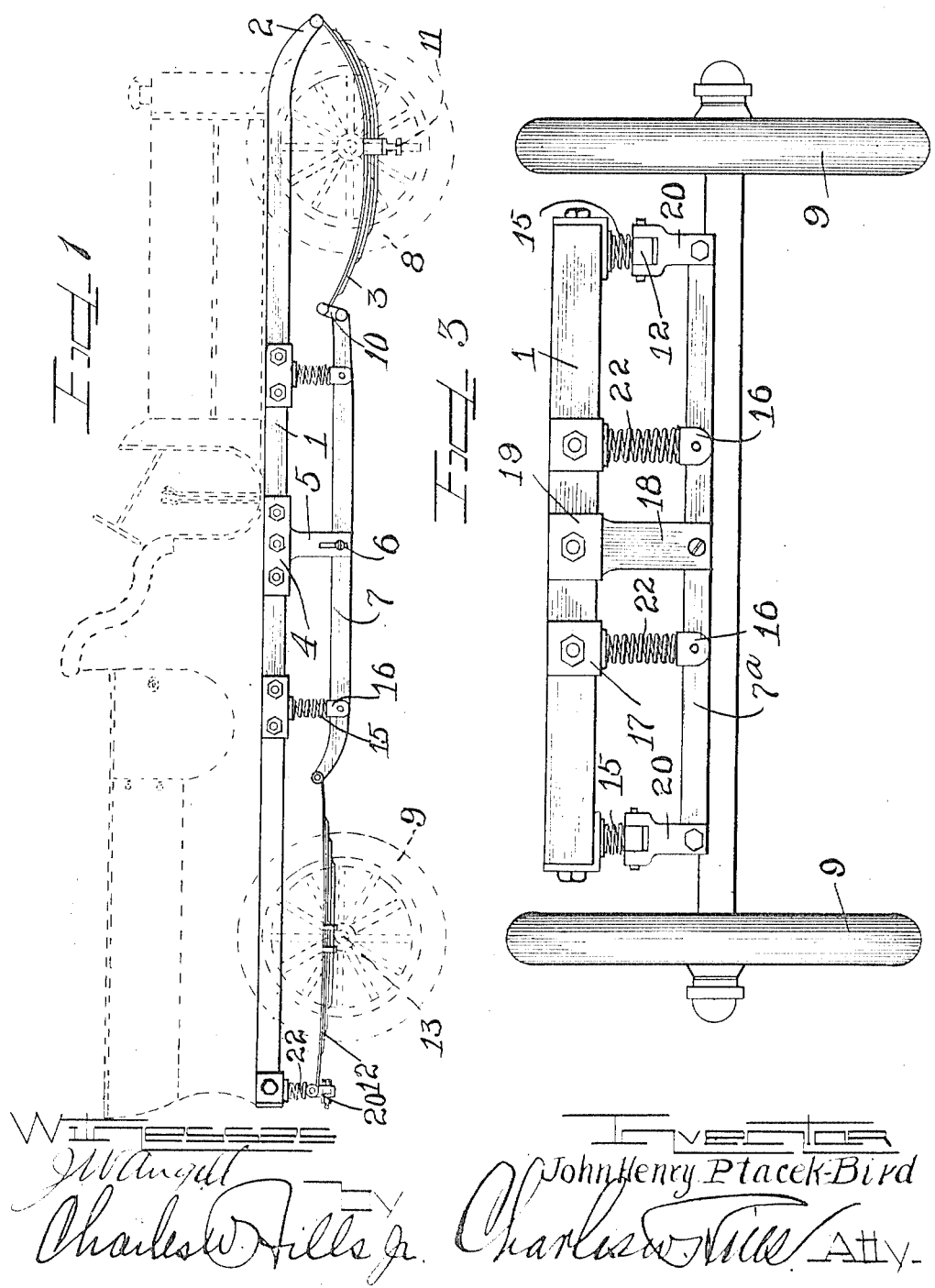

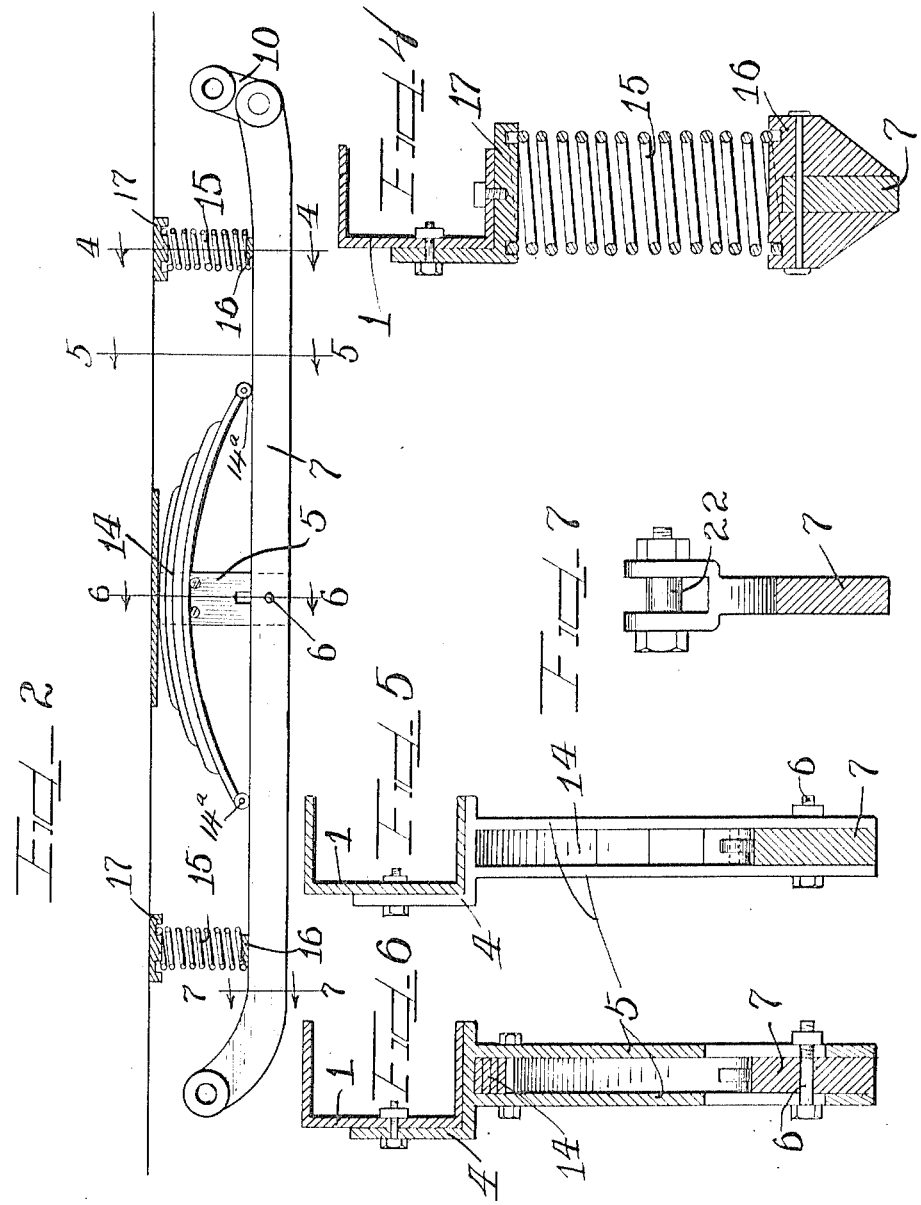

JOHN HENRY PTACEK-BIRD, OF CHICAGO, ILLINOIS.

SPRING SUSPENSION.

1,063,943.  Specification of Letters Patent.  Patented June 3, 1913.

Application filed November 16, 1911. Serial No. 660,661.

*To all whom it may concern:*

Be it known that I, JOHN HENRY PTACEK-BIRD, a citizen of the United States, and a resident of the city of Chicago, in the county of Cook and State of Illinois, have invented certain new and useful Improvements in Spring Suspensions; and I do hereby declare that the following is a full, clear, and exact description of the same, reference being had to the accompanying drawings, and to the numbers of reference marked thereon, which form a part of this specification.

The spring suspensions formerly used for vehicles, have proved inadequate for automobiles owing to the higher velocity at which the automobile travels, as compared with that of other road vehicles. Inequalities in the surface over which the automobiles move, which would not be noticed in a slower moving vehicle, cause serious inconvenience and discomfort to the occupants of an automobile moving over the same surface because of the greater weight and higher velocity of the automobile. In consequence, many attempts have been made to afford a spring suspension to minimize the shock and vibration of the car when in motion, though most of these devices have with slight variation, been substantially the same in most particulars as in horse drawn vehicles.

Of course, it is well known that faulty spring suspension for the body of the automobile not only entails discomfort to the occupants of the car, but as well, causes serious loss through breakage occasioned either from the insufficiency of the springs to absorb shocks received from the road or occasioned by the vibration to which the mechanism is constantly subjected; in either case a fruitful source of accidents, occasioning delay and frequent loss of life.

The object of this invention is to so support the body of an automobile or other vehicle, upon the running gear thereof, that shocks and vibration received from the road surface will be absorbed before being communicated to the body, and to afford a construction permitting the utmost freedom of movement of either axle without of necessity disturbing the body of the vehicle.

It is also an object of the invention to afford a construction whereby the body of the vehicle is at all times supported either from shock or road vibration, upon suitable springs so disposed as to permit the wheels to pass over large obstructions without imparting shock to the body and the mechanism adapted to be supported thereon.

The invention in its preferred form is hereinafter more fully illustrated and described.

On the drawings: Figure 1 is a side elevation of the spring suspension embodying my invention, showing the body of the vehicle and the wheels in dotted lines. Fig. 2 is an enlarged detail section taken longitudinally of the chassis and with parts omitted. Fig. 3 is a rear end elevation. Fig. 4 is an enlarged section taken on line 4—4 of Fig. 2. Fig. 5 is an enlarged section taken on line 5—5 of Fig. 2. Fig. 6 is an enlarged section taken on line 6—6 of Fig. 2. Fig. 7 is an enlarged section taken on line 7—7 of Fig. 2.

As shown in the drawings: 1, indicates the side frame member or sill of the chassis of an automobile, which may be of the usual or any desired form or construction, and upon which is secured the body shown in dotted lines in Fig. 1, and the usual mechanism. As shown in Figs. 4 to 6 inclusive, said side frame member or sill comprises a channel bar of pressed steel or otherwise, the front end 2, of which is turned downwardly to afford connection in the usual manner, with the front end of the front spring 3. Rigidly bolted on each of said side frame members or sills at the middle thereof, is a bracket 4, having downwardly extended parallel arms 5, provided with vertical slots therethrough at their lower ends, as shown in Fig. 6, and pivotally engaged on a bolt 6, extending through said slots in said arms, is an equalizing bar 7, of a length to extend from near the front wheel 8, to near the rear wheel 9, thereof. Pivotally engaged on the front end of the equalizing bar 7, is a link 10, of the usual form, to the free end of which the rear ends of the front springs are engaged as usual. Said front spring is secured upon the front axle 11, in any suitable manner, and the rear springs 12, are likewise secured upon the rear axle 13, as preferred. As shown, the front ends of the rear springs are pivotally engaged in a suitable bolt extending through the slightly upturned rear end of the equalizing bar 7, as shown in Figs. 1 and 2.

Rigidly secured at the middle thereof to the side frame member or sill 1, and between the arms 5, as shown in Fig. 2, is a half elliptical spring 14, the ends of which each may be provided with a roller 14ª, which bears upon the upper face of the equalizing bar. As shown also, strong coiled springs 15, one near each end of each equalizing bar, seat at the lower end in suitable clips or supports 16, therefor secured on said equalizing bar, and at the upper end seat in suitable recesses in brackets 17, secured on the under side of the sill, and act together with the spring 14, when the same is used, to yieldingly support the body on said equalizing bars. In a similar manner an equalizing bar 7ª, is pivotally engaged at its middle between downwardly extending arms 18, secured on a bracket 19, engaged centrally at the rear end of the chassis. Said rear equalizing bar, as shown, is of substantially the same length as the width of the chassis, and pivotally engaged thereon and extending upwardly from each end thereof, is a link 20, yoked at its upper end to receive the rear ends of the rear side springs 12.

Coiled springs 22, one at each side of the middle of the equalizing bar, as shown in Fig. 3, seat at their lower ends upon bearing blocks 16, as before described, and at their upper ends bear against brackets 17, corresponding with the brackets 17, before described.

The operation is as follows: Shock coming upon either or both front wheels, is absorbed through all the springs of the suspension owing to all said springs being flexibly connected by means of said equalizing bars. In consequence, but slight (if any) shock or vibration is imparted to the body of the car. Inasmuch as either front wheel may rise over an obstacle, said wheel is able to pass freely up against the resistance of the load imparted thereto on the springs, said upward movement serving to elevate therewith the forward end of the equalizing bar against the tension of its springs, the same acting as a lever to communicate the stress of such movement to the forward end of the rear spring with a slight downward thrust, this again being absorbed at the rear end of the vehicle on the rear equalizing bar. Should both front wheels be affected simultaneously by inequalities in the road, whether both said wheels are raised or both descend, or one is raised and the other descends, the shock is nevertheless equalized and distributed to the rear and to all the springs of the suspension, the body being thereby relieved from the shock and consequent vibration. This also is true with reference to the rear wheels. Furthermore, owing to the construction described, should the shock be sufficient to affect the body at all, the movement is relatively slow and easy and is never sharp nor abrupt. In consequence, the comfort of the rider is assured under practically all conditions, and the driving mechanism is relieved from much of the stress to which ordinarily subjected heretofore.

Of course, it is to be understood that, if desired, a transverse equalizing bar may be employed at the front end of the car as well as at the rear end. The character of the springs employed between the sill and the equalizing bars will vary with the load to be sustained. In many instances, the coiled springs 15, may be omitted, and the half elliptical spring 14 only used, or, if preferred, the half elliptical spring may be omitted, and the coiled springs only used. In any event, it is to be understood that I have shown but a preferred form of my invention, and that I do not purpose limiting the patent to be granted on this application otherwise than necessitated by the prior art, for numerous details of construction and arrangement may be varied, without departing from the principles of this invention.

I claim as my invention:

1. The combination with the wheels and axles of a vehicle, of longitudinally extending springs supported on each axle at each side of the vehicle, an equalizing bar connecting the front and rear springs at each side the vehicle, an equalizing bar yieldingly connecting the rear ends of the rear springs, a vehicle body, springs supporting the body upon the equalizing bars, and arms secured to the body and having slotted engagement with the lateral equalizing bars.

2. In a vehicle the wheels, and axles, a spring frame supported upon the axles, and comprising longitudinally extending side springs and equalizing bars yieldingly connecting the same, springs supporting the body yieldingly upon the equalizing bars, and arms secured to the sills of the body and having slotted engagement with the equalizing bars.

3. An automobile suspension embracing the wheels, axles and body, longitudinally extending front and rear springs secured on said axles, an equalizing bar swingingly engaged at the rear end of each front spring and pivotally engaged at the front end of each rear spring, an equalizing bar connected with the rear ends of the rear springs, springs supporting the body upon the equalizing bars, pivotal connections between the front ends of the front springs and the body and between the rear end of the body and the rear equalizing bar, and guides engaged on the body and having a slotted engagement with pins on the lateral equalizing bars.

In testimony whereof I have hereunto subscribed my name in the presence of two subscribing witnesses.

JOHN HENRY PTACEK-BIRD.

Witnesses:
CHARLES W. HILLS, Jr.,
GEORGE R. MOORE.